United States Patent [19]

Carrens

[11] 4,174,112
[45] Nov. 13, 1979

[54] SEAL ASSEMBLY
[75] Inventor: Donald E. Carrens, Tulsa, Okla.
[73] Assignee: Dresser Industries, Inc., Dallas, Tex.
[21] Appl. No.: 942,092
[22] Filed: Sep. 13, 1978
[51] Int. Cl.$^2$ .............................................. F16J 15/32
[52] U.S. Cl. .................................... 277/171; 277/205
[58] Field of Search ................ 277/168, 171, 205, 206

[56] References Cited

U.S. PATENT DOCUMENTS

| | | | |
|---|---|---|---|
| 1,818,985 | 8/1931 | Burnish | 277/205 |
| 2,438,153 | 3/1948 | Dick | 277/171 |
| 2,679,441 | 5/1954 | Stillwagon | 277/205 |
| 2,692,155 | 10/1954 | Gheen | 277/205 |
| 2,770,510 | 11/1956 | Collins | 277/171 |
| 2,802,535 | 8/1957 | Taylor | 277/205 |
| 2,885,227 | 5/1959 | Burger | 277/171 |
| 3,117,796 | 1/1964 | Liebig | 277/205 |

FOREIGN PATENT DOCUMENTS 1161202  8/1969  United Kingdom ................... 277/171

Primary Examiner—Robert I. Smith
Attorney, Agent, or Firm—Richard M. Byron

[57] ABSTRACT

A seal assembly for a downhole hydraulically operated oil well pump has a dovetail shaped groove around the exterior of the pump body and a seal element mounted therein. The seal element has an inner side resting against the groove bottom, one end of a full thickness filling that end of the groove and extending therefrom toward the opposite end having a recess portion around the outer perimeter thereof forming a lip about a midportion of the seal element which is deformed by fluid pressure acting toward that end of the seal to urge the lip outward into sealing contact with a pump housing which encloses the pump body.

8 Claims, 6 Drawing Figures

SEAL ASSEMBLY

TECHNICAL FIELD

This invention is related to seal assemblies used with downhole oil well hydraulic pumps to seal between the pump body and a housing which contains or mounts the pump when it is installed in the well.

BACKGROUND OF THE INVENTION

Some pumps used in this oil well service are provided with some type of seal around the pump body to seal within portions of the pump housing. Typically these seals are constructed with a metal ring to provide sufficient radial strength and prevent their being dislodged from the pump body while the pump is installed in or removed from the well. Because these prior art seal constructions include a metal ring, the seal cannot be radially expanded and slipped over the pump body for installation. This construction necessitates the pump body being made in several separable sections to allow for installation of these seals. This multiple section construction complicates the manufacture of the pump body as well as requiring additional seals within the pump.

SUMMARY OF THE INVENTION

In an embodiment, a seal assembly is provided which mounts in a groove around the body of a downhole oil well hydraulic pump by being slipped over the pump body and when in place provides a fluid tight seal between the pump body and the housing. The groove is of a dovetail construction and the seal element is accordingly shaped to fit within the groove. The seal element exterior is tapered and has a lip around the outer periphery thereof to sealingly engage the pump housing interior.

One object of this invention is to provide a seal assembly overcoming the aforementioned disadvantages of the prior art devices.

Still one other object of this invention is to provide a seal assembly for a downhole oil well hydraulic pump which can be easily slipped over the pump body and held in place by the shape of the groove around the body.

Still another object of this invention is to provide a seal assembly for a hydraulic oil well pump which can withstand repeated assembly and disassembly by installing the pump body within the housing and removing it from the housing without damage to the seal element.

Various other objects, advantages, and features of this invention will become apparent to those skilled in the art from the following discussion, taken in conjunction with the accompanying drawings, in which:

Figure 1:
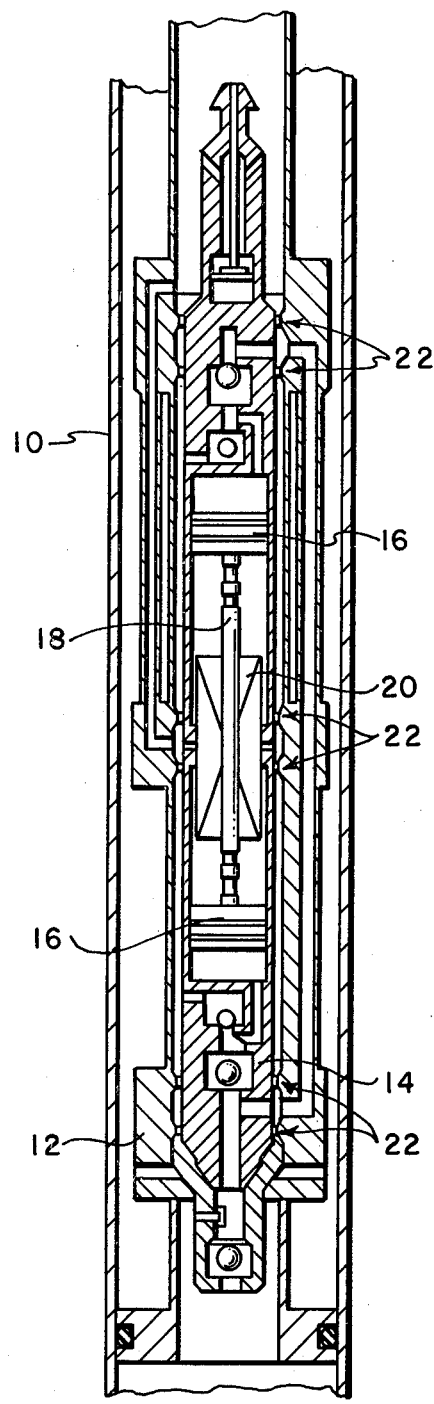
FIG. 1 is a cutaway pictorial elevation view of a segment of well casing having a hydraulically actuated down-hole pump housing and pump body mounted therein.

The following is a discussion and description of preferred specific embodiments of the seal assembly of this invention, such being made with reference to the drawings, whereupon the same reference numerals are used to indicate the same or similar parts and/or structure. It is to be understood that such description and discussion is not to unduly limit the scope of the invention.

DETAILED DESCRIPTION

Referring to FIG. 1, such shows a downhole oil well hydraulically actuated pump and employing the seal assemblies of this invention mounted within a segment of casing 10. The pump consists of a pump housing 12 which is sealingly mounted within casing 10 and is hollow on the interior thereof to receive and mount the pump body 14 which contains the working elements of the pump. Pump body 14 contains a pair of pistons 16 which are secured to opposite ends of a pump rod 18. Pump rod 18 extends through a reversing valve assembly 20 which controls the motion of the pistons 16. Fluid passageways between pump body 14 and pump housing 12 are sealed by a plurality of seal assemblies 22. The several seal assemblies 22 are a plurality of the seal assembly of this invention and provide seals at the points within the pump where fluid under pressure is transmitted between pump housing 12 and pump body 14.

Figure 2:
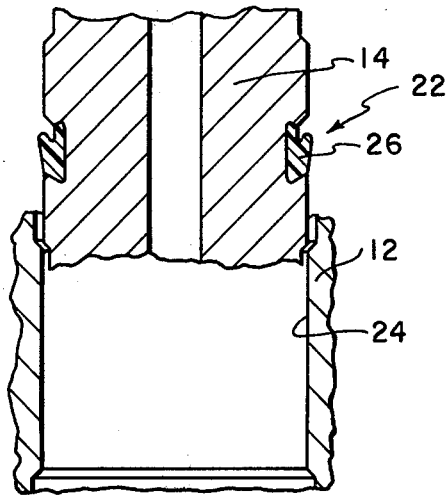
FIG. 2 is a cross-sectional elevation view of a segment of a pump housing and a segment of a pump body having the seal assembly of this invention with the seal element spaced from the entrance to the pump housing prior to installation.
Figure 3:
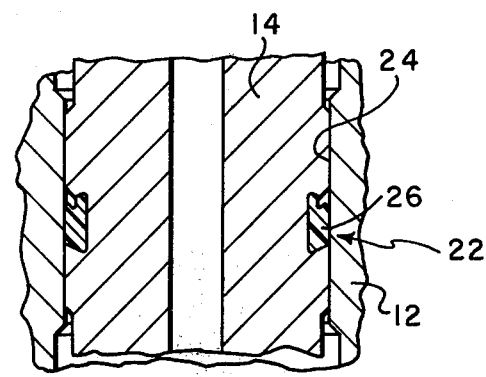
FIG. 3 is a cross-sectional elevation view of a segment of the pump housing and pump body shown in FIG. 2 with the seal assembly installed.

FIG. 2 shows a segment of pump housing 12 and a segment of pump body 14 with seal assembly 22 around pump body 14 in a spaced relation to the pump housing bore 24 where it will ultimately reside when installed. Displacement of pump body 14 into its final resting position in pump housing 12 positions the seal assembly within the confines of seal bore 24. Positioning seal assembly 22 at this location radially compresses the seal element 26 to produce a fluid tight seal between pump body 14 and pump housing 12.

Figure 4:
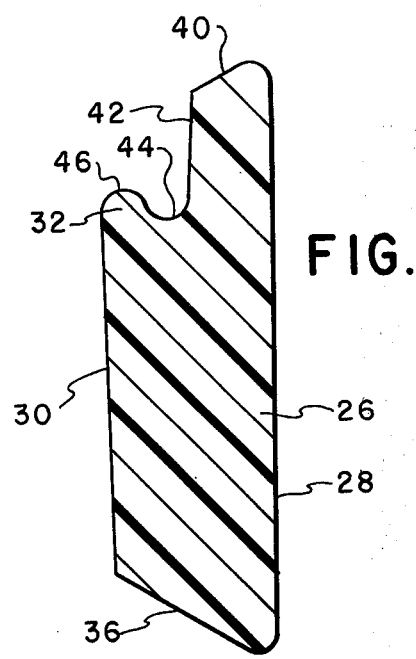
FIG. 4 is an enlarged cross-sectional elevation view of the seal element alone in a free position.

FIG. 4 shows seal element 26 in an enlarged cross-sectional view with the seal element in its undeformed or free state. Seal member 26 is constructed of a molded elastomeric compound and formed in the shown shape. The interior of seal element 26 has an inner peripheral surface 28 which is uniform in cross-section and substantially the same diameter as the bottom of the groove in which the seal element will be mounted. The exterior of seal element 26 has an outer peripheral surface 30 which is inclined relative to inner peripheral surface 28. A recess at one end of seal element 26 around the outer periphery thereof forms a lip 32. Outer peripheral surface 30 is inclined or tapered so the portion of the seal element having lip 32 is at the greater thickness portion of the seal element. Seal end surface 36 is inclined relative to inner peripheral surface 28 and oriented to fit within the confines of the dovetail groove around the valve body 14. Seal end surface 36 is smoothly curved to join seal inner peripheral surface 28 as shown.

Seal end surface 40 is angularly oriented to correspond with the internal shape of the dovetail groove in valve body 14. Seal end surface 40 is smoothly curved to join seal inner peripheral surface 28 as shown. Around the outer peripheral portion of this end of seal element 26, the recess which forms lip 32 includes an elongated side 42 substantially parallel to inner peripheral surface 28 and extending from end surface 40 toward the opposite end of the seal element. Elongated surface 42 joins a radially inner end of a cross-sectionally S-shaped surface which connects on its other end with outer peripheral surface 30. An inner curved portion 44 of this S-shaped surface extends toward seal element end 36 and the other curved portion 46 of this S-shaped surface extends in the opposite direction thereby forming lip 32. The S-shaped surface in its radially outer portion forms a portion of lip 32 and its radially inner portion forms an undercut of the material which comprises the lip. The radial thickness of this undercut can be approximately the same as the radial thickness of lip 32 in its thickest portion as shown in the drawings. This proportion will allow significant flexure of lip 32 and accomodation for radial compression of the seal element to insure proper sealing.

Figure 5:
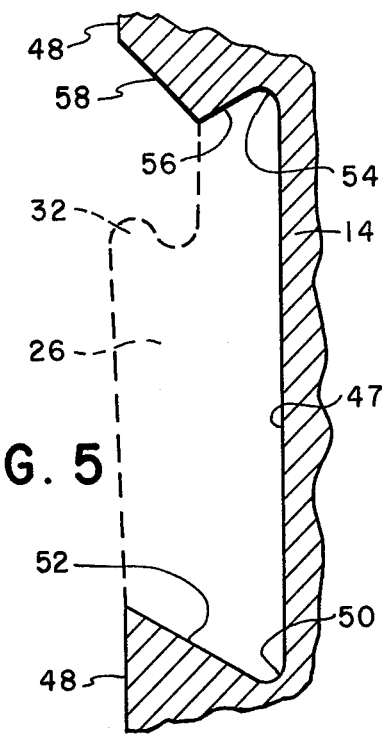
FIG. 5 is an enlarged cross-sectional elevation view of a segment of the pump body having the groove and with the seal element shown positioned therein in dashed lines.

FIG. 5 shows in an enlarged view the sealing element groove in pump body 14. This groove is generally dovetailed in its cross-sectional shape and includes a bottom surface which is parallel to the longitudinal axis of valve body 14 and opposed sides, one of which extends to pump body outer surface 48 in a uniform fashion and the other of which extends to pump body outer surface 48 in a broken or two step fashion. Referring to the lower portion of FIG. 5, this shows the simplest groove side which includes a curved surface 50 connecting groove bottom surface 47 to an inclined groove side 52 that extends to pump body outer surface 48. At the opposite side of the groove, another curved surface 54 connects groove bottom surface 47 with a short inclined groove side 56 that terminates approximately at the mid-depth of the groove. Inclined groove side 56 is oriented in the opposite direction to incline groove side 52. Another groove end surface 58 is inclined in the opposite direction to surface 56 and joins the radially outer end of groove side 56 and connects with pump body outer surface 48 in order to provide a relief in that end portion of the sealing element groove which makes the dovetail feature in that side of the groove approximately one half the depth of the dovetail feature in the opposite side of the groove.

FIG. 5 shows seal element 26, in dashed lines, positioned in the sealing element groove. Seal element 26 is sized to fit within the confines of the dovetailed shaped groove wherein seal end surfaces 36 and 40 rest adjacent to groove sides 52 and 56 and inner peripheral seal surface 28 rests in adjacent to groove bottom surface 47. On the outer periphery of seal element 26, outer peripheral surface 30 aligns with pump body outer surface 48 at the juncture of groove inclined side surface 52 and seal end surface 36. Because seal element 26 is thicker through the portion having lip 32, that portion of the seal element extends radially outward beyond the cylindrical plane or form defined by the pump body outer surface 48 and that portion of the seal is displaced upon installation of the pump body in pump housing 12.

Figure 6:
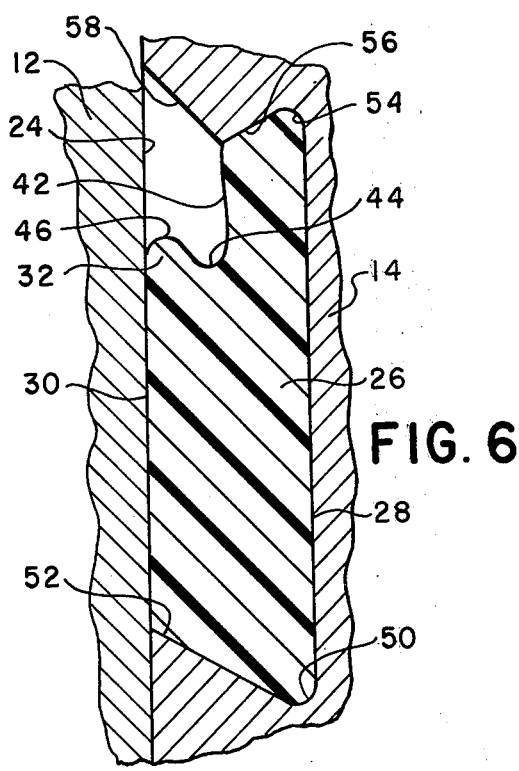
FIG. 6 is an enlarged cross-sectional elevation view of a segment of the pump body and pump housing with the seal ring mounted therein showing the seal element with fluid pressure applied toward the seal from the upper portion of the figure or the end of the seal having the recess.

FIG. 6 illustrates the seal element in a position it assumes when pump body 14 is mounted within pump housing 12 and fluid pressure is applied to the seal element from between the pump housing and pump body at the end of the seal with lip 32. Seal outer peripheral surface 30 is in flush fluid tight sealing contact with pump housing bore 24. Because of the fluid pressure in the cavity between lip 32 and groove side 58, seal element 26 is urged generally toward the opposite side of the groove and the recess around the outer perimeter of the seal element can be deformed somewhat as shown in FIG. 6.

A feature of the seal assembly of this invention lies in the tapered construction of the seal element outer peripheral surface. This shape permits a seal element to be easily slipped into pump housing bore 24 because the seal is gradually compressed as it is moved into bore 24 from a larger diameter portion of pump housing 12. Removal of the pump body and the seal from the pump housing is also assisted by the tapered construction because it provides less drag when sliding over pump housing bore 24 than would a nontapering or substantially constant diameter seal element. In use of this seal assembly, it can seal when fluid pressure is applied from either direction; however, it is preferred that fluid pressure be applied toward the end having lip 32.

Another feature of the seal assembly of this invention is that the seal element is constructed of a material which is sufficiently resilient to enable it to be stretched over a pump housing and into place in the groove. This feature overcomes the heretofore requirement of pump bodies to be made in several separable segments. Because this seal assembly does not require a sectionalized separable pump housing, it makes simpler pump housing designs possible by eliminating threaded connections, etc. which are necessary to take them apart. Groove end surface 58 permits the seal ring to be slipped easily into the groove by deforming the seal ring. To install the seal ring, it is simply slipped over the outer surface of the pump body and into the groove.

For use in the downhole hydraulic pump, the seal assembly of this invention has a definite advantage over the seal assemblies previously used because it can be slipped over the pump body and positioned in the groove. Prior art constructions, discussed above, have multiple segment pump bodies that are separated at the seal groove because the seal elements have an encapsulated rigid support ring which cannot be stretched over the pump body. Because this seal element can be easily stretched over the pump body for installation, it simplifies the pump design and construction because it eliminates the need for joints in the pump body.

Although the seal assembly of this invention is shown with a downhole hydraulic pump, it can obviously be used with other equipment where a seal of this nature is needed or desirable. For example, the seal assembly can be used where it is desired to seal between two conduits like in couplings.

The embodiments of the invention in which an exclusive property or privilege is claimed are defined as follows:

1. In a downhole hydraulically operated pump having a generally cylindrically shaped pump body which has an annular seal assembly therearound and which is mounted within a bore in a hollow pump housing, an improved seal assembly comprising:

(a) a cross-sectionally generally dovetail shaped groove around said pump body; and (b) an annular seal element mounted in said groove and having an inner surface resting adjacent to the bottom of said groove, an outer portion including an outer peripheral sealing surface extending from one end thereof over a major portion of the exterior of said seal element, and a lip formed at the opposite end thereof by a recess around the outer perimeter thereof which undercuts a segment of said seal ring at that end portion thereof, said lip being shaped so that fluid pressure acting toward the end of said seal element having said lip will bias said lip outward into sealing engagement with the pump housing.

2. The seal assembly of claim 1, wherein said dovetail shaped groove has one side extending from the bottom of the groove to the outer periphery of said valve body in an unbroken surface, and the opposite side of said groove is defined by a broken surface including an inner side portion extending from the groove bottom in an angular relation opposite to the first recited groove side, and an inclined groove outer side portion angularly oriented in a direction opposite to said groove inner side portion.

3. The seal assembly of claim 2, wherein said inner surface is substantially uniform in diameter and said outer peripheral sealing surface is inclined relative to said inner surface with said surfaces being farthest apart at the end of said seal element having said lip such that said seal element has a generally tapered form such that said seal element can slip easily into said pump housing bore and be radially compressed into sealing contact between said pump body and said housing.

4. The seal assembly of claim 3, wherein said seal element through the larger diameter portion thereof extends radially outward of the exterior surface of said cylindrically shaped pump body such that an interference fit is created when said seal element is inserted into said pump housing bore.

5. The seal assembly of claim 1, wherein said recess forming said lip is defined by a reduced diameter portion of said outer peripheral sealing surface at one end portion of said seal element and a smoothly contoured curvature undercutting said lip such that the radial thickness of said lip is approximately one half of the depth of said recess from said outer peripheral sealing surface.

6. A seal assembly for sealing around a tubular member which is mounted within an opening in a housing or the like, comprising:
(a) a cross-sectionally generally dovetail shaped groove around said tubular member with one side of said groove being dovetailed in the bottom portion only and having the outer portion of this side inclined in a divergent relation from said groove; and
(b) an annular seal element mounted within said groove and extending therefrom, including an inner portion contacting the bottom of said groove, an outer portion extending from the groove, an outer peripheral sealing surface on the exterior of the seal element, and a lip formed at one end portion of the seal element by a recess around the outer perimeter thereof which undercuts a segment of said seal ring at that end portion thereof, said lip being shaped so that fluid acting toward the end portion of the seal element having said lip will urge said lip outward into sealing engagement with said housing.

7. The seal assembly of claim 6, wherein:
(a) said seal element has an inner surface which is substantially uniform in diameter and said outer peripheral sealing surface is inclined relative to said inner surface with said surfaces being farthest apart at the end of said seal element having said lip such that said seal element has a generally tapered from such that it can slip easily into said pump housing and be radially compressed into sealing contact between said pump body and said housing thereby holding said lip in fluid tight sealing contact with said housing; and
(b) said recess forming said lip is defined by a portion of said outer peripheral sealing surface located at a mid-portion of said seal which has a smoothly contoured curvature undercutting said lip such that the radial thickness of said lip is approximately one half the depth of said recess from said outer peripheral sealing surface.

8. The seal assembly of claim 7, wherein said smoothly contoured curvature is defined by a cross-sectinally generally S-shaped surface which forms the unattached end of said lip and said undercut.

* * * * *

UNITED STATES PATENT OFFICE
CERTIFICATE OF CORRECTION

Patent No. 4,174,112    Dated November 13, 1979

Inventor(s) Donald E. Carrens

It is certified that error appears in the above-identified patent and that said Letters Patent are hereby corrected as shown below:

In the claims:

Claim 7, line 29, "from" should read "form".

Signed and Sealed this

Twenty-fifth Day of March 1980

[SEAL]

Attest:

SIDNEY A. DIAMOND

Attesting Officer    Commissioner of Patents and Trademarks